Aug. 13, 1935.  J. T. H. DEMPSTER  2,011,397
COFFEE MAKER
Filed April 14, 1934  2 Sheets-Sheet 1
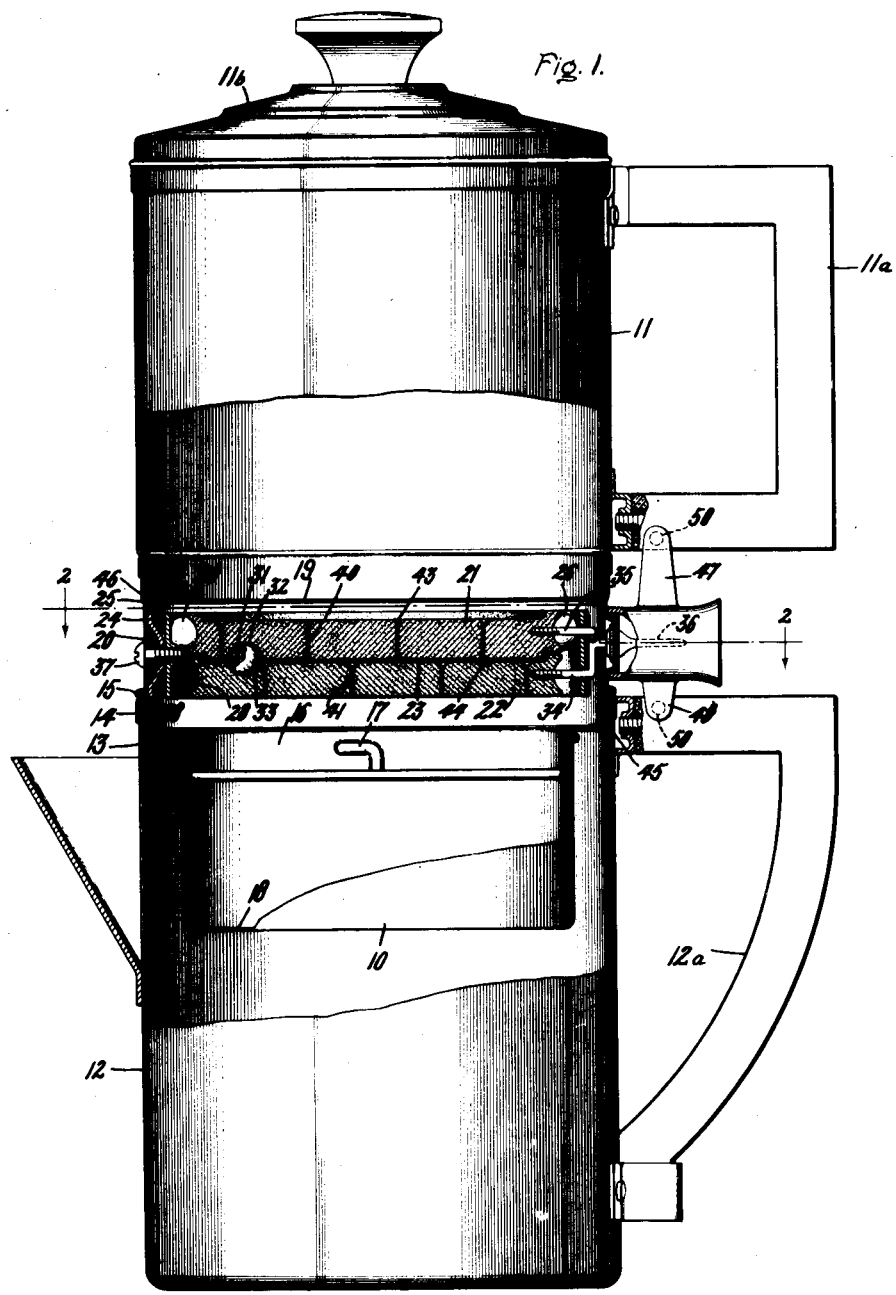
Inventor:
John T. H. Dempster,
by Harry E. Dunham
His Attorney.

Aug. 13, 1935.  J. T. H. DEMPSTER  2,011,397
COFFEE MAKER
Filed April 14, 1934   2 Sheets-Sheet 2
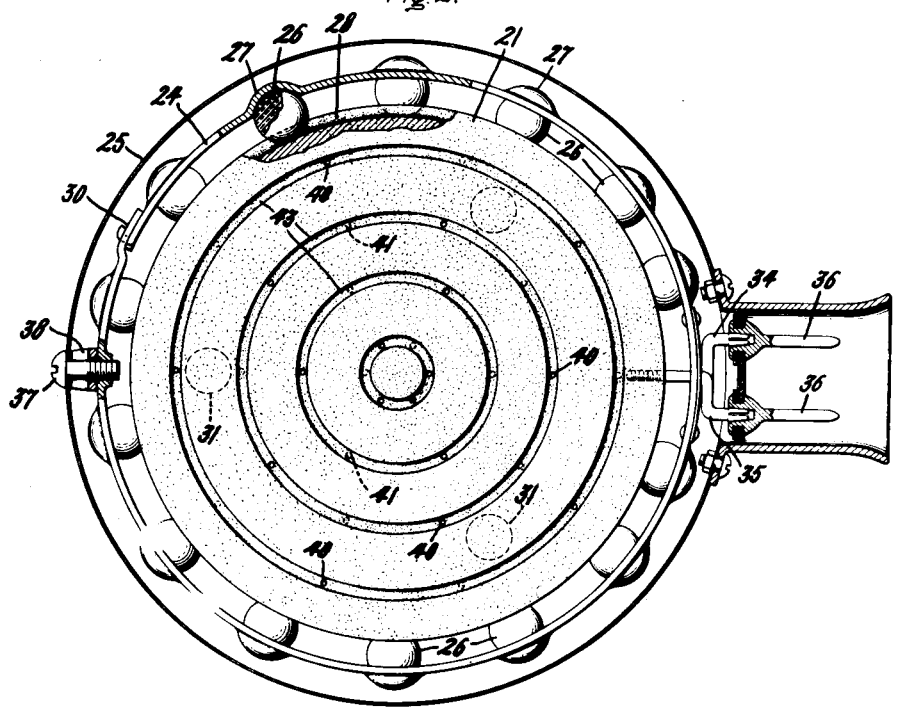
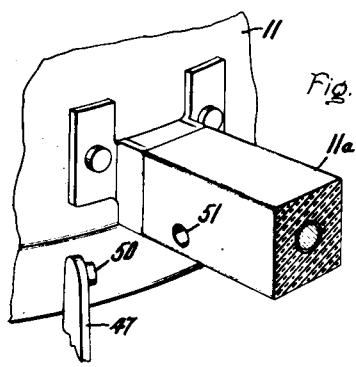
Inventor:
John T. H Dempster,
by Harry E. Dunham
His Attorney.

UNITED STATES PATENT OFFICE 2,011,397

COFFEE MAKER

John T. H. Dempster, Schenectady, N. Y., assignor to General Electric Company, a corporation of New York Application April 14, 1934, Serial No. 720,606

7 Claims. (Cl. 219—40)

This invention relates to coffee makers, more particularly to coffee makers of the "French drip" type, and it has for its object the provision of an improved device of this character.

Coffee makers of the drip type generally comprise a ground coffee container and a receptacle for receiving hot water arranged over it and having an imperforate bottom wall through which the water flows at a relatively slow rate to and through the coffee container to form the coffee infusion or brew. Beneath the coffee container is a receptacle for receiving the coffee brew.

It is desirable in making coffee in this type of apparatus that the water delivered to the coffee grounds from the upper receptacle be held at a substantially constant temperature within the range of approximately 192° to 198° F. This has been very difficult and practically impossible to do with most of the coffee makers heretofore generally used, because the water is heated by separate means, such as a gas or an electric range, and is then poured into the upper water receptacle. The temperature of the water placed within the receptacle is reduced first because it is somewhat chilled by contacting the walls of the receptacle which usually are comparatively cool, and then since it requires from five to ten minutes for the water to seep through the ground coffee to the brew receptacle, there is a considerable loss of temperature by radiation. The first part only, therefore, of the water reaching the ground coffee is likely to have a temperature within the desired range. The remainder is usually entirely too cool to make good coffee.

This invention contemplates the provision of an improved coffee maker arranged to continually heat the water gravitating from the water receptacle as it passes to the coffee grounds so that every bit of the water that reaches the grounds will be heated substantially to the desired uniform temperature.

It is a further object of this invention to provide suitable heating means which is automatically turned on when water is poured into the upper receptacle and is automatically turned off when all of the water in the receptacle has dripped through the coffee grounds.

A still further object of this invention is the provision of an improved heating element for drip coffee makers.

In accordance with this invention in one form thereof a suitable heating chamber is arranged between the ground coffee container and the upper container for receiving the fresh water. Within the heating chamber are provided a pair of electrodes arranged to define a chamber between them through which the water from the upper container passes to the ground coffee container. The water passing through this chamber completes an electric circuit between the electrodes and is heated by the passage of electric current through it. Preferably, the electrodes will be arranged substantially transversely of the heating chamber, one being arranged above the other and the two being in spaced relation to define the heating space or chamber between them. Each electrode is provided with a plurality of substantially vertically arranged conduits, those in the upper electrode conducting the water from the upper receptacle to the heating space and those in the lower electrode conducting the heated water to the ground coffee container. These latter also function to distribute the heated water over the upper surface of the coffee container.

Preferably, the heating chamber will be formed as a unit separate from the other elements of the maker so that it can be conveniently removed or attached, as desired. It is preferable to arrange the heating element so that it can be seated in the upper portion of the brew receptacle and also so that it will receive at its upper end the water receptacle. More specifically, it is preferable to arrange the lower container with a seat for receiving the heating chamber and likewise to provide a seat in the heating element for receiving the upper receptacle.

For a more complete understanding of this invention, reference should be had to the accompanying drawings in which Fig. 1 is an elevation of a coffee maker embodying this invention, parts being shown in section and parts being broken away so as to illustrate certain details of construction; Fig. 2 is a horizontal sectional view taken through the line 2—2 of Fig. 1 and looking in the direction of the arrows; and Fig. 3 is a perspective view of a portion of the apparatus shown in Fig. 1.

Referring to the drawings, this invention has been shown in one form as applied to a coffee maker of the French drip type comprising a coffee ground container 10, a water receptacle 11 arranged above the ground coffee container and arranged to permit water placed therein to gravitate or drip to the coffee container, and a lower receptacle 12 arranged below the coffee container to receive the coffee infusion or brew made by the seepage or percolation of water through the ground coffee in the container 10. The receptacles 11 and 12 are provided with handles 11a and 12a respectively. The receptacle 11 is provided with a cover 11b.

Preferably, the ground coffee container 10 will be supported within and from the upper edges of the side walls of the container 12. As shown, the coffee container 10 is secured to a member 13 that is fitted within the upper end of the infusion receptacle 12. The member 13 is provided with a vertical cylindrical wall 14 which is arranged within the walls of the receptacle 12 and having a sliding fit therein. This portion 14 is provided with a bead 15 at its upper edge for limiting the insertion of the member 13. The member 13, as shown, is also provided with another cylindrical vertical portion 16 which has a diameter somewhat less than the diameter of the portion 14 and the walls of the container 12. The coffee container 10 is secured to this portion 16 by bayonet connections 17 (only one being shown). The container 10 is provided with an imperforate bottom wall 18 through which the water percolating through the ground coffee in the container can flow to the infusion reception 12.

The upper or water receptacle 11 likewise is provided with an imperforate bottom wall 19 through which the water is delivered to the coffee container 10.

Interposed between the coffee container 10 and the upper water receptacle 11 is a heating chamber 20 arranged to heat the water gravitating from the upper receptacle 11 to the coffee container 10 so that all of the water that reaches the coffee container has substantially the same desired temperature.

The heating chamber 20 is provided with a pair of electrodes 21 and 22 arranged transversely of the chamber, as clearly shown in Fig. 1. These electrodes may be formed of any suitable material, but preferably will be formed of graphite or carbon, or a mixture of these materials, because they are resistant to wear, and moreover, graphite or a mixture of graphite and carbon having a large percentage of graphite avoids the deposit of injurious products, such as lime or other salt deposits, as might be occasioned if the electrodes were formed of metal.

The electrodes 21 and 22, as shown, are substantially circular in shape, that is, they have a substantial disc shape, and they are arranged within the heating chamber one above the other so as to define a relatively narrow heating chamber 23 between them. The electrodes preferably will be supported by a ring-like member 24 which in turn is supported within an outer frame or casing 25. Each electrode 21 and 22 is supported by a plurality of spherical members 26 which, as shown, are provided with seats 27 in the supporting ring 24 corresponding to the balls; and with a seat 28 in the electrode. Whereas the seats 28 in the electrodes are formed continuously about the peripheries of the electrodes, as shown in Fig. 2, separate seats 27 for each ball are formed at spaced intervals in the supporting ring 24 for the purpose of holding the spheres 26 in spaced relation with each other circumferentially of the ring and the electrodes. The ring 24 and spheres 26 may be assembled with the electrodes by making the member 24 as a split ring that may be sprung apart to receive the electrodes and the spheres, after which the split ends may be secured by any suitable connection, such as a tongue and slot connection 30.

The spheres 26 are formed of any suitable electrically insulating material, such as porcelain, so as to effectively insulate the electrodes from the ring 24.

The electrodes 21 and 22 are secured in their vertically spaced relation with respect to each other to define the chamber 23 by means of a plurality of spheres 31, likewise formed of an electrically insulating material, such as porcelain. As shown (Fig. 2), three of these spheres 31 are provided spaced substantially 120° apart. The electrodes 21 and 22 are provided with seats 32 and 33 respectively (Fig. 1) for receiving these balls.

Suitable electrical terminals 34 and 35 respectively are electrically and mechanically connected with the electrodes 21 and 22. As shown, each of these terminals is secured by a threaded connection to its electrode. These members 34 and 35 are electrically connected with suitable terminal pins 36 of a plug and socket supply connection well-known in the art.

The supporting ring 24 is supported at its side opposite the terminals by means of a suitable screw 37, which, as shown, is directed through an aperture provided for it in the casing 25 and is received in screw-threaded relation by the ring 24. A suitable spring washer 38 is positioned between the two rings so as to space the ring 24 from the casing 25. The terminal side of the ring 24 is secured to the casing 25 by means of the terminals 34 and 35.

The upper electrode 21 is provided with a plurality of vertically arranged passageways 40 passing through the electrode so as to provide conduits through which the water dripping from the container 11 can pass to the transverse passageway or chamber 23 between the electrodes. The lower electrode 22 is provided with similarly arranged conduits 41 establishing communication between the chamber 23 and the ground coffee container 10. Preferably, the passageways 40 at their upper ends will communicate with circular channels 43, as clearly shown in Fig. 2, and preferably the upper ends of the conduits 41 in the lower electrode will communicate with similarly arranged channels 44. It is also preferable to arrange the conduits 41 in the lower electrode in staggered relation with respect to the conduits 40 in the upper electrode, as shown in Fig. 2, whereby the water flowing to the narrow chamber 23 from the upper electrode will be spread laterally in different directions to form a thin film or sheet of water between the electrodes before it can gravitate through the conduits 41 to the coffee container. It will be observed that the conduits 41 in the lower electrode distribute the water substantially uniformly over the coffee container 10.

The lower end of the frame or casing 25 rests in a seat 45 provided for it in the member 13, while its upper end is provided with a seat 46 for receiving the lower end of the water receptacle 11, as shown clearly in Fig. 1.

Suitable means are provided for locking the receptacles 11 and 12 and the heating chamber 20 together. This means comprises vertically arranged arms 47 and 48 arranged above and below the terminal receptacle, as shown in Fig. 1. Pins 50 project laterally from the sides of these members, as shown in Figs. 1 and 3. The pin 50 on the upper arm 47 is received in a suitable recess 51 provided for it in the handle 11a of the upper container, while the pin 50 of the lower arm 48 is received within a similar recess provided for it in the handle 12a of the lower container. When the heating chamber 20 has been assembled with the lower receptacle 12 and the upper receptacle 11 has been assembled with the heating chamber, as shown in Fig. 1, the parts can be turned relatively to each other so as to bring the pins 50 within their recesses 51. This locks the members together so as to prevent displacement or tipping of the members from each other when the coffee is poured from the lower receptacle 12.

In the operation of this apparatus, if it is desired to make coffee, the upper receptacle 11 and the heating chamber 20 will be removed from the lower receptacle, and the desired amount of ground coffee will be placed within the container 10. Then the heating chamber and the upper receptacle will be replaced, and the desired quantity of water placed within the upper container 11.

Previous to this, the terminal pins 36 will have been plugged into a suitable source of electrical supply. As soon as the water is placed within the receptacle 11, it begins to gravitate through its bottom perforated wall 19 to the upper surface of the upper electrode 21. The water finds its way to the circular channels 43 and then flows down through the vertical conduits 40 to the chamber 23. As soon as the water reaches the chamber 23, it spreads out in a thin film between the two electrodes and completes an electric circuit between them whereby the water is heated substantially to the boiling point. The heated water in this chamber finds its way to the circular channels 44 in the upper surface of the lower electrode and from these channels flows down through the conduits 41 to the coffee container 10 through which the water percolates or seeps into the brew receptacle 12. The water continues to flow through the electrode chamber 23 in this manner so as to be heated until all of the water has drained out of the receptacle 11 into the coffee container 10, whereupon the electric circuit between the two electrodes 21 and 22 is automatically broken. This automatically turns off the heat.

It will be observed, therefore, that the electric heater is automatically turned on when water is placed within the receptacle 11 and is automatically turned off when the coffee has been made.

The electrodes 21 and 22, as shown, are made relatively thick so that they have a relatively large heat storage capacity. These electrodes become heated very quickly and apply heat to the water in the chamber 11 above it. Thus, the water is heated not only by completing an electric circuit between the two electrodes, but also is preheated to a rather high temperature by conduction of heat from the electrodes to the body of water in the container 11.

It has been found that while the water within the chamber 23 has substantially the boiling temperature of 212° F., the water which falls into the coffee container 10 will have a temperature between 192° to 198° F. and that this temperature will remain substantially constant. That is, all of the water delivered to the coffee container 10 has substantially the same temperature falling within this range. This is quite important because it has been found by actual experiment that far better coffee is made when the temperature is thus held constant than when the water temperature gradually cools as in the case of drip coffee makers heretofore generally used.

It is preferable to lock the receptacles 11 and 12 in the manner previously described so that it is unnecessary to disassemble the parts after the coffee has been made. Thus, the coffee can be poured from the container 12 without danger of the upper receptacle 11 toppling over. However, if desired, after the coffee has been made the upper receptacle 11, the heating chamber 20 and likewise the coffee container 10 can be removed if desired before the coffee is poured.

An important feature of this invention resides in the fact that the electrical heating element 20 is turned on and off automatically when water is poured into the receptacle 11 and when the coffee has been made. Thus, there is no possibility that the heating element can burn out by reason of the fact that the attendant has left the coffee maker plugged into the electrical supply source.

Another important feature of this invention resides in the fact that the wattage input to the coffee maker drops considerably while the water is being heated. Thus, whereas the current consumption at the very beginning of the operation rises rapidly to approximately 500 watts, it quickly drops off to around 300 watts and then gradually drops off to zero as the quantity of water in the receptacle 11 decreases. This is because the electrodes become heated, as previously described, and in turn transfer heat to the water remaining in the vessel 11.

It is contemplated that the heating unit 20 comprising the electrodes 21 and 22, their supporting ring 24 and the frame 25, together with the plug receptacle, will be formed as a separate unit which may be applied to existing French drip coffee makers now being used. It will be observed that the frame 25 is arranged to be inserted within the seat 14 which normally is provided for the upper receptacle 11, and at its upper end is provided with a seat 46 which receives the lower end of the receptacle 11 that normally is placed within the seat 14 of the lower receptacle.

As previously pointed out, the electrodes are formed of graphite or a mixture of this material and carbon. This is important because it has been found that the electrodes "shed" or throw-off lime and other salts that may be deposited on them. This is probably due to the greasy or slippery nature of graphite.

While I have shown a particular embodiment of my inventiion, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is,—

1. A coffee maker and the like comprising a coffee infusion receptacle, a ground coffee container in the upper portion of said receptacle, a heating unit above said coffee container comprising a pair of electrodes arranged transversely of said coffee container and in vertically spaced relation with each other so as to define a relatively narrow chamber between them transversely of said coffee container, a water receptacle above said heating unit having means whereby water therein can flow to the upper surface of the upper of said electrodes, said upper electrode having a plurality of vertically arranged passageways for conducting said water on said upper surface to said chamber between said electrodes, and the lower of said electrodes having a plurality of vertically arranged passageways for conducting the water from said chamber to and distributing it over said coffee container.

2. A coffee maker and the like comprising a coffee infusion receptacle, a separable ground coffee container having a portion seated within the upper end of said receptacle and provided with a bead at its upper end engaging the upper end of said receptacle to support said container, said portion being provided with a circular supporting portion, a separable heating chamber having its lower end seated on said supporting portion and having at its upper end a circular supporting portion, and a separable water receptacle having its lower end seated on said circular supporting portion of said heating chamber.

3. A coffee maker and the like comprising a coffee infusion receptacle, a perforate ground coffee container in the upper portion of said receptacle, a water receptacle above said coffee container having an imperforate bottom wall, a heating chamber between said water chamber and said coffee container, a pair of electrodes within said heating chamber formed chiefly of graphite arranged transversely thereof one above the other in spaced relation so as to define a relatively narrow chamber between them, each of said electrodes having a plurality of vertically arranged conduits establishing communication between said narrow chamber and said water receptacle and said coffee container respectively, the conduits in each electrode being in staggered relation with those in the other electrode and those of said lower electrode functioning to distribute the heated water over the coffee grounds in said coffee container, means for electrically insulating said electrodes from each other and from the walls of said heating chamber, and electrical supply terminals connected to said electrodes.

4. A heating unit for a coffee maker of the "French drip" type comprising a frame adapted to be seated in the lower infusion receptacle of said maker and adapted to receive in its upper end the upper water receptacle of said maker, electrical heating means in said frame arranged to heat the water while it drops from said upper to said lower receptacle and terminal pins for said heating means carried by said frame accessible on the exterior thereof for the reception of an electrical supply plug.

5. A heating unit for a coffee maker of the "French drip" type comprising a frame adapted to be seated in the lower infusion receptacle of said maker and adapted to receive in its upper end the upper water receptacle of said maker, and a pair of electrodes formed chiefly of graphite in said frame defining a chamber for receiving the water from said upper receptacle and heating said water while it flows through said chamber by passing an electrical current through it.

6. A heating unit for a coffee maker of the "French drip" type comprising a frame adapted to be seated in the lower infusion receptacle of said maker and adapted to receive in its upper end the upper water receptacle of said maker, a pair of electrodes having substantially the same surface area arranged cross wise of said frame one above the other, insulating members interposed between said electrodes holding them in vertically spaced relation, insulating members interposed between each of said electrodes and said frame arranged to support said electrodes in said frame, terminal pins carried by said frame on the exterior thereof, and electrical connections between said terminal pins and said electrodes.

7. A heating unit for a coffee maker of the "French drip" type comprising a frame adapted to be seated in the lower infusion receptacle of said maker and adapted to receive in its upper end the upper water receptacle of said maker, a pair of electrodes, a plurality of spherical insulating members between said electrodes received in recesses provided for them in said electrodes and arranged to hold said electrodes in spaced relation to define a water passageway between them, a plurality of spherical insulating members between each of said electrodes and said frame received in recesses provided for them in said electrodes and frame and arranged to secure said electrodes to said frame, terminal pins carried by said frame on the exterior thereof and electrical connections between said terminal pins and said electrodes.

JOHN T. H. DEMPSTER.